(12) United States Patent
Blumfield et al.

(10) Patent No.: US 7,890,946 B2
(45) Date of Patent: Feb. 15, 2011

(54) EFFICIENT PATCHING

(75) Inventors: Anthony Blumfield, Redmond, WA (US); Gilad Golan, Redmond, WA (US); Jason Garms, Woodinville, WA (US); Saud Alshibani, Issaquah, WA (US); Scott A. Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 10/880,709

(22) Filed: Jun. 30, 2004

(65) Prior Publication Data

US 2005/0257207 A1 Nov. 17, 2005

Related U.S. Application Data

(60) Provisional application No. 60/570,124, filed on May 11, 2004.

(51) Int. Cl.
*G06F 9/44* (2006.01)
(52) U.S. Cl. .................. 717/171; 717/126; 717/176
(58) Field of Classification Search ......... 717/124–126, 717/168–178; 713/191
See application file for complete search history.

(56) References Cited

U.S. PATENT DOCUMENTS

| | | | |
|---|---|---|---|
| 5,155,847 A | 10/1992 | Kirouac et al. | |
| 5,675,803 A | 10/1997 | Preisler et al. | |
| 5,764,992 A | 6/1998 | Kullick et al. | |
| 6,006,034 A * | 12/1999 | Heath et al. ............ | 717/170 |
| 6,137,880 A | 10/2000 | Bella | |
| 6,161,218 A | 12/2000 | Taylor | |
| 6,199,204 B1 | 3/2001 | Donohue | |
| 6,237,144 B1 * | 5/2001 | Delo ........................ | 717/174 |
| 6,360,366 B1 | 3/2002 | Heath et al. | |
| 6,363,524 B1 | 3/2002 | Loy | |
| 6,370,686 B1 * | 4/2002 | Delo et al. ............... | 717/174 |
| 6,434,744 B1 | 8/2002 | Chamberlain et al. | |
| 6,438,621 B1 | 8/2002 | Kanamori et al. | |
| 6,463,584 B1 | 10/2002 | Gard et al. | |
| 6,490,723 B1 * | 12/2002 | Bearden et al. .......... | 717/174 |
| 6,738,932 B1 | 5/2004 | Price et al. | |

(Continued)

FOREIGN PATENT DOCUMENTS

EP 1 333 375 8/2003

(Continued)

OTHER PUBLICATIONS

Cygwin, "g77 (v0.5.19) patch for b17", 2001, web.archive.org/web/2001, pp. 1-9.*

(Continued)

*Primary Examiner*—Ted T Vo
(74) *Attorney, Agent, or Firm*—Perkins Coie LLP

(57) ABSTRACT

A facility for augmenting software in a target computer system is described. The facility receives and augmentation specification in the target computer system. The augmentations specification specifies: (a) a function to be augmented, (b) a parameter of the function to be tested, (c) a test to apply to the specified parameter, and (d) and modification to perform to the behavior of the function if the specified test is not satisfied by the specified parameter. When the specified function is invoked on the target computer system, if the specified tested is not satisfied by the specified parameter, the facility performs the specified modification to the behavior of the specified function.

42 Claims, 5 Drawing Sheets

U.S. PATENT DOCUMENTS

| | | | |
|---|---|---|---|
| 6,789,215 B1* | 9/2004 | Rupp et al. | 714/38 |
| 6,859,923 B2 | 2/2005 | Taylor | |
| 6,915,513 B2 | 7/2005 | Duesterwald et al. | |
| 6,920,631 B2* | 7/2005 | Delo | 717/174 |
| 6,944,856 B2* | 9/2005 | Taylor | 717/171 |
| 7,111,285 B2* | 9/2006 | Smith et al. | 717/140 |
| 7,461,374 B1 | 12/2008 | Balint et al. | |
| 7,559,058 B2 | 7/2009 | Blumfield et al. | |
| 7,784,044 B2 | 8/2010 | Buban et al. | |
| 2002/0116665 A1* | 8/2002 | Pickover et al. | 714/38 |
| 2002/0174422 A1 | 11/2002 | Kelley et al. | |
| 2003/0033597 A1 | 2/2003 | Allsop et al. | |
| 2003/0145317 A1 | 7/2003 | Chamberlain | |
| 2004/0003266 A1 | 1/2004 | Moshir et al. | |
| 2004/0015949 A1 | 1/2004 | Taylor | |
| 2004/0031028 A1* | 2/2004 | Hunt et al. | 717/170 |
| 2004/0060039 A1* | 3/2004 | Fujikawa et al. | 717/124 |
| 2004/0107416 A1 | 6/2004 | Buban et al. | |
| 2004/0255284 A1 | 12/2004 | Kobayashi | |
| 2005/0256664 A1 | 11/2005 | Blumfield et al. | |
| 2005/0257208 A1 | 11/2005 | Blumfield et al. | |

FOREIGN PATENT DOCUMENTS

| | | |
|---|---|---|
| EP | 1 388 787 | 2/2004 |
| WO | WO-9826349 A2 | 6/1998 |
| WO | WO-9907007 A2 | 2/1999 |
| WO | WO 2004/027541 | 4/2004 |
| WO | WO-2004027541 A2 | 4/2004 |

OTHER PUBLICATIONS

Cygwin, "Cygwin Package Contributors Guide", 2001, web.archive.org/web/2001, pp. 1-9.*

Andrews, "Knowledge-Based Debugging: Matching program behaviour against known causes of failure", Oct. 2001, A thesis, University of Kent at Canterbury, pp. i-vi, 1-166.*

Clifton, "A Treatise on Using Debug and Trace classes, including Exception Handling", 2002, The Code Project, http://www.codeproject.com, pp. 1-10.*

Liu, Chang and Debra J. Richardson, "Automated Security Checking and Patching Using TestTalk," IEEE, 2000, pp. 261-264.

U.S. Appl. No. 10/881,810, filed Jun. 30, 2004, Golan et al.

U.S. Appl. No. 10/880,848, filed Jun. 30, 2004, Golan et al.

Gonzalez, Marc et al., "Applying Interposition Techniques for Performance Analysis of OPENMP Parallel Applications," 2000 IEEE (6 pages).

Ollmann, Gunter, "HTML Code Injection and Cross-Site Scripting," Copyright 2002 Internet Security Systems, Ltd. (5 pages).

Guemara El Fatmi, S. et al., "Quality of Service Provision in High-Speed Networks: An Active Approach," 2002 IEEE (4 pages).

Australian Patent Office Search Report, Application No. SG 200502121-7, May 12, 2006, 4 pages.

Hunt, Galen et al., "Detours: Binary Interception of Win32 Functions," Proceedings of the 3rd USENIX Windows NT Symposium, Seattle, WA, Jul. 1999, 9 pages.

Buck, Bryan et al., "An API for Runtime Code Patching," Dyninst, http://www.dyninst.org/papers/, Apr. 11, 2000, 12 pages, USA.

* cited by examiner

EFFICIENT PATCHING

CROSS-REFERENCE TO RELATED APPLICATIONS

This application claims the benefit of U.S. Provisional Application No. 60/570,124, entitled "EFFICIENT PATCHING," and filed on May 11, 2004 and is related to U.S. patent application Ser. No. 10/307,902, entitled "PATCHING OF IN-USE FUNCTIONS ON A RUNNING COMPUTER SYSTEM," and filed on Dec. 2, 2002; U.S. patent application Ser. No. 10/881,810, (patent counsel's docket number 41826.8019US), entitled "EFFICIENT PATCHING", filed concurrently herewith; and U.S. patent application Ser. No. 10/880,848, (patent counsel's docket number 41826.8020US), entitled "EFFICIENT PATCHING", filed concurrently herewith, each of which is hereby incorporated by reference in its entirety.

TECHNICAL FIELD

The present invention is directed to the field of updating the operation of installed computer programs.

BACKGROUND

Patching is the process of modifying already-installed programs, including application programs, utility programs, operating systems and operating system components, device drivers, etc. Patching can be useful to modify programs for a variety of purposes, including correcting a programming error, reducing or eliminating a security risk, or improving the logic used by the modified program. Patching is typically initiated by the company or other organization that originally supplied the program to be patched.

Installed programs are predominantly composed of executable code modules. As one example, many programs designed to execute on the WINDOWS XP operating system from Microsoft Corp. of Redmond, Wash. are predominantly composed of executable code modules called "DLLs." One popular conventional approach to patching is to identify, among the executable code modules making up the installed program to be patched, the executable code module containing the program code that one wishes to modify with a patch; creating a new version of the identified executable code module in which the desired modification is made; and distributing the new version of the identified executable code module, together with an installer program, to users who may wish to apply the patch. Each user then determines whether s/he wishes to apply the patch, and if so, executes the installer program, which replaces the original version of the identified executable code module with the new version of the identified executable code module.

Conventional approaches to patching have a number of significant disadvantages. These disadvantages often increase the burden associated with receiving and applying patches. In some cases, this increased burden delays the application of some patches by some users, and even prevents the application of some patches by some users. Such delay and prevention in the application of patches can in some cases have serious negative consequences for users, especially for patches designed to reduce or eliminate a security risk.

One disadvantage of conventional approaches to patching relates to common cases in which multiple patches must be created and distributed to effect a single modification to a single program. In some cases, the program to be patched has several different "flavors" of a particular executable code module, such as a different flavor for each operating system or operating system version on which the program is designed to execute, and/or each natural language version of the program. Where the identified executable code module is such an executable code module, the patch creation and distribution process described above must be repeated for each flavor of the identified executable code module. The user must then select and apply the patch for the appropriate flavor of the identified executable code module. Sorting through the resulting large number of patches and selecting the proper set of patches for application on each user's computer system can be very burdensome, so much so that this condition is sometimes called "patch hell." In some cases, an administrator must maintain an inventory database identifying the set of executable module versions installed on each target system, which is used to select appropriate conventional patches for each target system.

Another disadvantage of conventional approaches to patching relates to the large size of the distributed patches. It is not uncommon for executable code modules to have a size measured in megabytes, which in turn causes a single patch to have a comparable size, making it unwieldy to distribute and store, or even impossible to distribute and store, for some users. This problem can be multiplied for patches having multiple flavors. Further, because each conventional patch typically includes an entire substitute executable module, applying conventional patches can contribute to the problem of code churn.

A further disadvantage of conventional approaches to patching relates to a need by some users to test patches before applying them to production computer systems. In some cases, installing a patch on a computer system can have adverse results, such as where the new version of the identified executable code module contained in the patch introduces a new programming error, or where it causes a new, unpredicted interaction with another program running on the computer system against which it is applied. Accordingly, often before applying a patch against a production system whose data and operation are important to sustain, the user first applies the patch against a testing system to evaluate whether the patch is safe to apply to the production system. Such separate testing of patches adds to the burden associated with patching. Additionally, where a conventional patch creates a problem—such as an application compatibility problem or a new exploit vulnerability—at a time substantially after the patch is applied, it can be difficult to trace such problems back to the patch.

An additional disadvantage of conventional approaches to patching relates to the operation of the installer included in the patch. Often, in order to replace an executable code module that is part of executing program, the installer must first terminate execution of that program. Also, in some cases, such replacement cannot be completed without restarting the computer system. Both of these steps can cause substantial disruptions in the use of the patched computer system.

Another disadvantage of conventional approaches to patching involves attempting to patch an executable module for which a "private fix," also called a "hot fix," has earlier been issued to a proper subset of the customers for that executable module. In such cases, because of difficulties encountered in distributing conventional patches that substitute different new versions of the executable code module depending upon to each user depending upon whether the user has applied the hot fix, it is typical to instead distribute a simple conventional patch that substitute a single new version of the executable module irrespective of whether the user has applied the hot fix. If that new version embodies the hot fix, the patch imposes the hot fix on customers not intended to receive it. If, on the other hand, that new version does not embody the hot fix, it deprives the customers intended to receive the hot fix of the hot fix.

Another disadvantage of conventional approaches to patching involves the fact that the installers for software products that rely on a particular executable module, such as a particular dynamic link library, often "hide" that executable module by storing it in a non-standard location in the target computer system's filesystem. Accordingly, it is sometimes difficult or impossible to determine whether a particular target system contains a copy of an executable module to be patched, and, if so, where it resides in the target computer system's filesystem. Also, some software products maintain a "catalog" of executable module versions that have been installed by their installers. A software product may rely upon the correctness of an indication in the catalog of the version of a particular executable module. Such reliance is defeated where a conventional patch replaces the version of the executable module identified in the catalog with a new version of the executable module without updating the catalog.

Another disadvantage of conventional approaches to patching springs from the fact that they are impossible to apply at a time before the executable module to be patched is installed in the target computer system. As a result, if the executable module to be patched is installed in the target computer system after a conventional patch for that executable module is received, it is unlikely that the patch will be applied to the executable module.

Another disadvantage of conventional approaches to patching is that they typically can only be applied by a user logged in to the target computer system using an administrative account having liberal modification permissions. Logging into an administrative account for this purpose can make the target computer system vulnerable to viruses present on the target computer system seeking to modify aspects of the target computer system and requiring liberal permissions to do so.

Another disadvantage of conventional approaches to patching is that conventional patches can be difficult or impossible to disable, requiring steps such as reversing the replacement of an executable module, or reversing one or more modifications to the system registry.

Accordingly, a new approach to patching that overcame some or all of the disadvantages of conventional approaches to patching discussed above would have significant utility.

DETAILED DESCRIPTION

Figure 1:
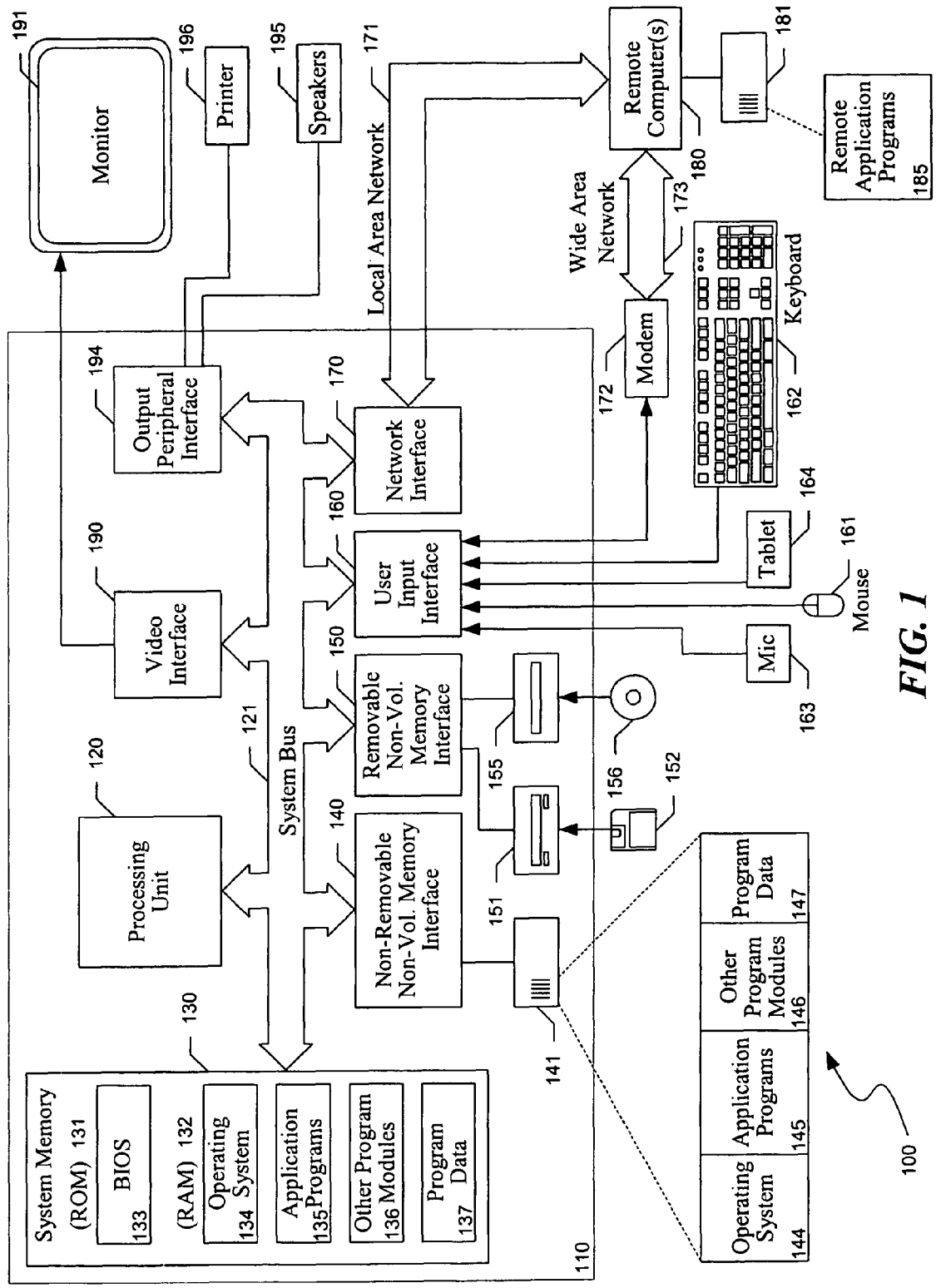
FIG. 1 illustrates an example of a suitable computing system environment in which the facility may be implemented.

A software facility for patching installed computer program code ("the facility") is provided. In some embodiments, the facility adds parameter testing and test result handling to installed functions. In other embodiments, the facility adds various other kinds of functionality to installed functions, in some cases at arbitrary positions in the installed functions' flows of execution.

In some embodiments, for each patch, the facility distributes to each computer system to be patched—i.e., each "target computer system"—the specification of a point at which to perform a test, the identity of the test to perform, and how to act in response to one or more different test results. In some embodiments, the facility provides a standard set of parameter validation and other tests whose use can be specified in patches. For example, a patch may specify that, for a particular function, if a particular parameter of the function does not have a certain value, invocation of the function should fail before its substantive execution begins. Another patch may specify that, for a particular function, if a particular parameter has a length exceeding a specified maximum length, the parameter should be truncated to the specified maximum length before execution of the function is permitted to proceed. Many security exploits rely on causing functions to be called with parameter values that, while they were not blocked in the original version of a function's code, cause the function to create or take advantage of an unsafe condition. In many cases, such exploits can be prevented by using such patches to prevent the function from executing with such parameter values. In some embodiments, the patches specify the testing of values other than function parameters, such as values read from a file or inputted by user.

In some embodiments, an automated patching agent automatically receives each patch, validates it, and stores it in a patch table for possible application. In some embodiments, each patch is applied to any instances of the executable module to be patched that are already loaded on the target computer system when the patch is received. This approach is referred to herein as "hot patching," and enables patches to become effective immediately upon being received, and does not require the facility to be able to determine where the executable module to be patched is stored on disk. In some embodiments, each received patch is applied to the disk image of the executable module to be patched, so that, when the disk image is loaded at future times, the loaded disk image includes the patch. This approach is referred to herein as "cold patching," and permits patches to be persistent across multiple sessions. In some embodiments, the facility performs both hot and cold patching. In some embodiments, each patch is applied to the executable module to be patched each time the executable module to be patched is loaded by the operating system's loader. This approach is referred to herein as "load-time patching." In some embodiments, each patch is applied to the executable module to be patched each time the function to be patched is invoked. This approach is referred to herein as "call-interception patching." Load-time patching and call-interception patching both (1) do not require the facility to be able to determine where the executable module to be patched is stored on disk, (2) facilitate ready reversibility of a particular patch, and (3) do not require modification of the executable module's disk image.

In some embodiments, the facility permits a user or administrator to configure the operation of patches that have been applied. As examples, such configuration can include, for a particular applied patch: whether the test specified by the patch is performed when execution reaches the point specified for the patch; whether the test result handling specified by the patch is performed or ignored; and/or whether performance of the test and/or its result is logged, displayed in warning message, etc. In these embodiments, the facility permits patches to be tested on production computer systems by initially enabling logging and disabling result handling. In these embodiments, the facility further permits operation of the patch to be logged in a "verbose mode" after enabling its result handling to assist with identifying instances in which the patch is creating a problem, such as an application compatibility problem or other IT problem. These embodiments also permit a patch to be quickly disabled after being applied if it is discovered that the patch is creating problems. Some embodiments of the facility also permit the patch to be quickly disabled by simply deleting the patch from the set of patches received and stored in the target computer system.

In some embodiments, the facility uses a "data-driven" patching approach, in which patches contain no code, but rather data, such as a small human-readable text or XML document, that specifies a point at which to perform a test, the identity of the test to perform, and how to act in response to one or more different test results. In such embodiments, a patching agent receives data-driven patches, and adds the tests and test handling specified by the patches. In some embodiments, the facility uses a "code-driven" patching approach, and which each patch contains a short program to be added to the executable module to be patched that itself performs the test by calling the facility's standard parameter testing functions, and that itself performs the test handling. Using data-driven patching or code-driven patching, it is sometimes possible to address all flavors of an executable module to be patched with a single patch.

In some embodiments, the facility signs each patch to demonstrate both that (1) the patch is from an approved source, and (2) the contents of the patch have not been modified since the time at which the patch was created by the approved source.

In some embodiments, the facility distributes every patch to every target computer system, and a patching agent on the target computer system determines automatically which patches or to be applied on the target computer system, and how they are to be applied, based upon the target computer system's characteristics. This relieves users and administrators of many of the burdens conventionally associated with selecting and applying patches, and the burden of maintaining an accurate and current inventory database. For example, these characteristics can include which version of the executable module to be patched is installed on the target computer system. In these embodiments, the facility can overcome the type of problems typically caused by hot fixes, by distributing patches that specify different handling for hot-fixed and un-hot-fixed flavors of a particular executable module, obviating any need to either sacrifice a hot fix for a particular executable module or make the hot fix ubiquitous when patching that executable module.

In some embodiments, the patching agent stores every patch received in the target system, irrespective of whether the executable module to be patched by a particular patch is installed on the target system when that patch is received. Because the facility in many cases applies patches in response to the loading of an executable module to be patched or the invocation of a function to be patched, the facility can apply a patch to an executable module that was installed on the target system after that patch was received in the target system. Also, patches can survive the uninstallation and subsequent reinstallation of the executable module to be patched.

In some embodiments, the patching agent is implemented in an operating system service. In these embodiments, the facility accords the patching agent any permissions required to apply a patch. These embodiments reduce the security risk typically imposed when conventional patches are applied, as they obviate any need for a user to log in to the target computer system using an administrative account having broad modification permissions, and thereby give any viruses present on the target computer system a greater opportunity to modify sensitive aspects of the target computer system.

The patches used by the facility are typically relatively small, and therefore impose modest resource requirements for transmission and storage. Also, because the patches used by the facility tend to modify the behavior of the patched software in a small number of well-defined ways, the facility helps to reduce the problem of code churn.

FIG. 1 illustrates an example of a suitable computing system environment 100 in which the facility may be implemented. The computing system environment 100 is only one example of a suitable computing environment and is not intended to suggest any limitation as to the scope of use or functionality of the facility. Neither should the computing environment 100 be interpreted as having any dependency or requirement relating to any one or combination of components illustrated in the exemplary operating environment 100.

The facility is operational with numerous other general purpose or special purpose computing system environments or configurations. Examples of well known computing systems, environments, and/or configurations that may be suitable for use with the facility include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth, which perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present facility, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

Figure 2:
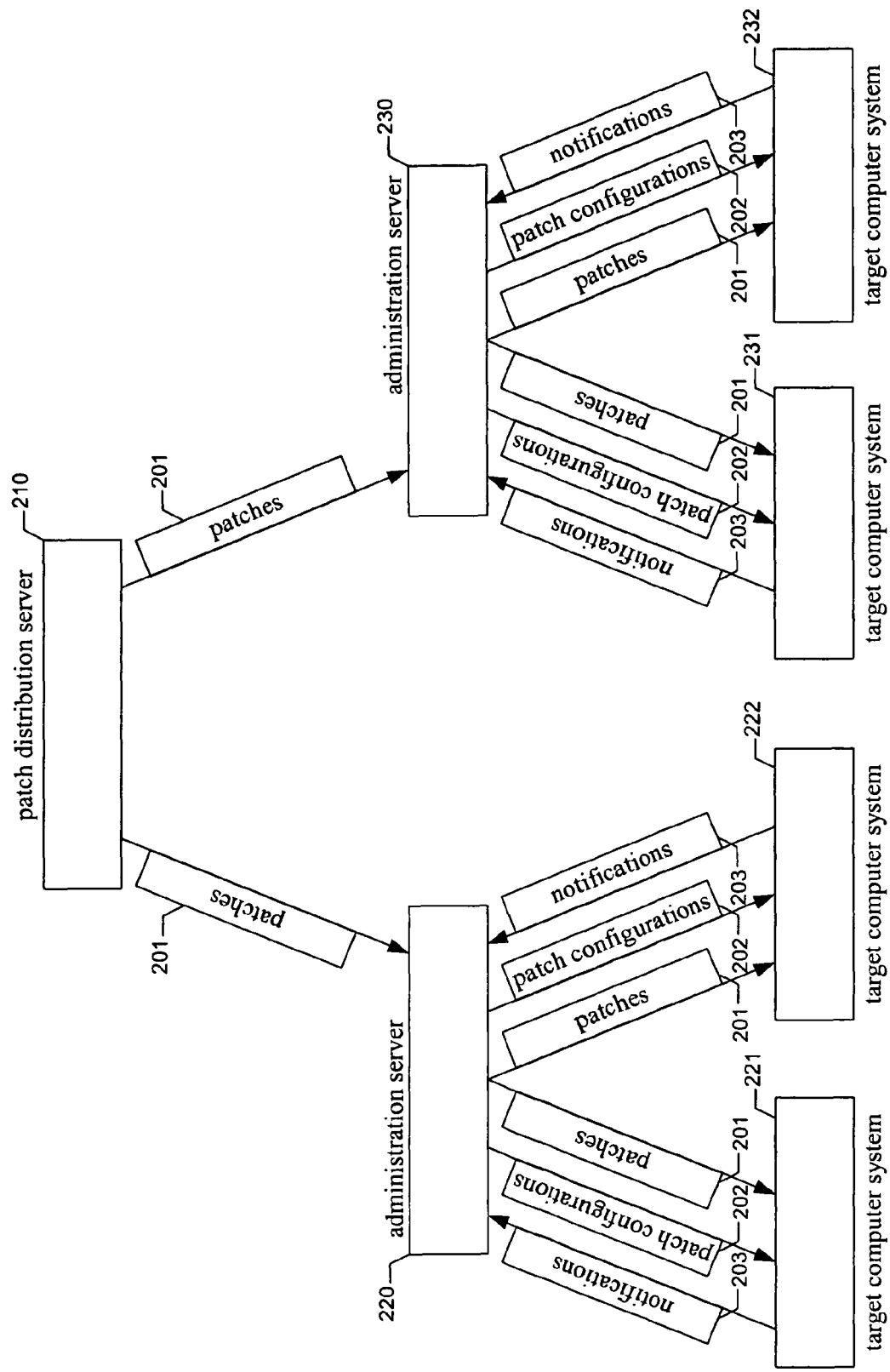
FIG. 2 is a data flow diagram showing a typical exchange of data between computer systems in accordance with the facility.

FIG. 2 is a data flow diagram showing a typical exchange of data between computer systems in accordance with the facility. The computer systems shown in FIG. 2 (computer systems 210, 220, 221, 222, 230, 231, and 232) typically have some or all of the components shown and discussed in conjunction with FIG. 1. At the patch distribution server, the facility generates one or more patches. These patches 201 are sent from the patch distribution server to one or more administration servers, such as administration servers 220 and 230. Each administration server, in turn, forwards the patches to one or more target computer systems, such as target computer systems 221, 222, 231, and 232. In some embodiments (not shown), the patch distribution server sends patches directly to one or more target computer systems, or via a more indirect route than through a single administration server. Patches received at a target computer system are processed at the target computer system as described in greater detail below. An administration server can also send patch configuration commands 202 to one or more target computer systems, which apply the patch configuration commands to reconfigure the operation of particular patches. As is discussed in greater detail below, a patch may be completely disabled; if a patch is not disabled, notification of its operation and its test result handling may each be independently enabled or disabled. When notification of its operation is enabled, notifications may be displayed or stored locally on the target computer system, or may be sent as notifications 203 to an appropriate administration server.

Figure 3:
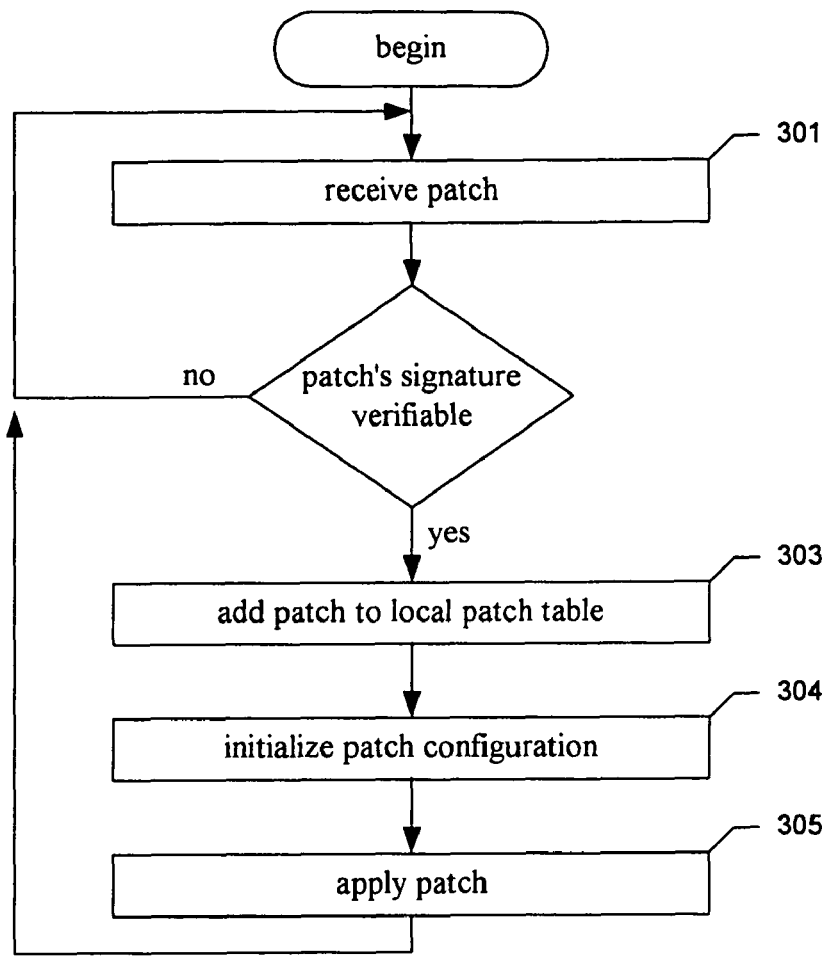
FIG. 3 is a flow diagram showing steps typically performed by the facility in order to receive and process a new patch.

FIG. 3 is a flow diagram showing steps typically performed by the facility in order to receive and process a new patch. In step 301, the facility receives a patch. The patch received in step 301 may be either a data-driven patch or a code-driven patch. A sample data-driven patch is shown in Table 1 below.

TABLE 1

| | |
|---|---|
| 1 | <Softpatch Patch="Q382429"> |
| 2 |   <AffectedApplication AffectedExe="sqlservr.exe"> |
| 3 |     <AffectedVersion Version="9.*"> |
| 4 |       <AffectedModules Name="SQLSORT.DLL"> |
| 5 |         <Version "8.0.*, 9.*"> |
| 6 |           <Function Name="SsrpEnumCore" Address= |
| 7 |             "0x0802E76B" Param="2" Paramtype= "LPSTR"> |
| 8 |             <Filter MaxByteLength="60" /> |
| 9 |             <Resolution ActionType="BOOL" Action="FALSE" /> |
| 10 |           </Function> |
| 11 |         </Version> |
| 12 |         <Version "10.*, 11.*"> |
| 13 |           <Function Name="SsrpEnumCore" Address= |
| 14 |             "0x0802D283" Param="2" Paramtype= "LPSTR"> |
| 15 |             <Filter MaxByteLength="128" /> |
| 16 |             <Resolution ActionType="BOOL" Action="FALSE" /> |
| 17 |           </Function> |
| 18 |         </Version> |
| 19 |       </AffectedModules> |
| 20 |     </AffectedVersion> |

TABLE 1-continued

| | |
|---|---|
| 21 |   </AffectedApplication> |
| 22 | |
| 23 |   <Signature Hash="MD5" Signature="C509-64AA-9161-8C52- |
| 24 |     9F6D-BF5A-AEF2-ECE1-0038-34D1"/> |
| 25 | </Softpatch> |

Line 1 contains a unique identifier for the patch. Line 2 identifies the application affected by the patch. Line 3 identifies the application version affected by the patch. Line 4 identifies the executable module affected by the patch. Line 5 identifies two versions of the affected executable module—versions 8.0.* and 9.*—for which patching directions are provided. Lines 6-10 contain patching directions for these two versions of the executable module. Lines 6-7 identify the function to be patched, its address in the executable module, its parameter to be tested by the patch, and the type of the parameter to be tested. Line 8 indicates that the parameter identified in lines 6-7 should be tested to determine whether its length exceeds 60 bytes. Line 9 indicates that the invocation of the function should fail if the test succeeds. Line 12 identifies two more versions of the affected executable module—versions 10.* and 11.*—for which patching directions are provided. Lines 13-17 contain patching directions for these two versions of the executable module. Lines 13-14 identify the function to be patched, its address in the executable module, its parameter to be tested by the patch, and the type of the parameter to be tested. It can be seen that the address of the function to be patched in the executable module identified in lines 13-14 for versions 10.* and 11.* is different from the address of the function to be patched identified in lines 6-7 for versions 8.0.* and 9.*. Line 15 indicates that the parameter identified in lines 13-14 should be tested to determine whether its length exceeds 128 bytes. Line 16 indicates that the invocation of the function should fail if the test succeeds. The patch may specify a variety of result handling action types, including failing the invocation of the patched function, raising an exception, terminating the process in which the patched executable module is being executed, or correcting the offending value (such as by truncating an overlong string). Lines 23-25 contain a signature for the patch that both identifies the source of the patch and verifies that the patch has not been altered since leaving its source.

Table 2 below contains a code-driven version of the patch shown in Table 1 above.

TABLE 2

| | | | |
|---|---|---|---|
| 1 | 00411A7E | push | 3Ch |
| 2 | 00411A80 | mov | eax,dword ptr [str] |
| 3 | 00411A83 | push | eax |
| 4 | 00411A84 | call | ValidateStringLength (411082h) |
| 5 | 00411A89 | add | esp,8 |
| 6 | 00411A8C | movzx | ecx,al |
| 7 | 00411A8F | test | ecx,ecx |
| 8 | 00411A91 | je | 411A9Ah |
| 9 | 00411A93 | jmp | foo+2 (411AD2h) |
| 10 | 00411A9A | xor | eax,eax |
| 11 | 00411A9C | ret | |

Lines 1-3 push parameters for the testing function onto the stack. Line 4 calls the testing function. Lines 5-8 branch on the return code for the testing function. If the testing function succeeded, line 9 jumps back to begin executing the body of the patched function. If the testing function failed, lines 10-11 push a failure result code onto the stack and returns from the patched function to the color of the patched function. For readability, Table 2 omits certain details present in some code-driven patches, including a verifiable signature, instructions that test for the current values of the patch configuration flags, and instructions relocated from the beginning of the code for the patched function.

In some embodiments, patches of both types may contain additional information, including, for each of one or more versions of the executable module to be patched, a file signature that can be used to validate that a particular instance of the executable module is a proper copy of that version. Such a file signature may be, for example, a size or checksum for the entire executable module version, or the code expected to occur at a particular point in the executable module, such as at the offset at which the executable module is to be patched.

In step 302, if the patch is signed with a valid signature, then the facility continues in step 303, else the facility continues in step 301 to receive the next patch. In step 303, the facility adds the patch to a local patch table. In step 304, the facility initializes the initial configuration of the patch, such as by sending it to a default configuration.

Figure 4:
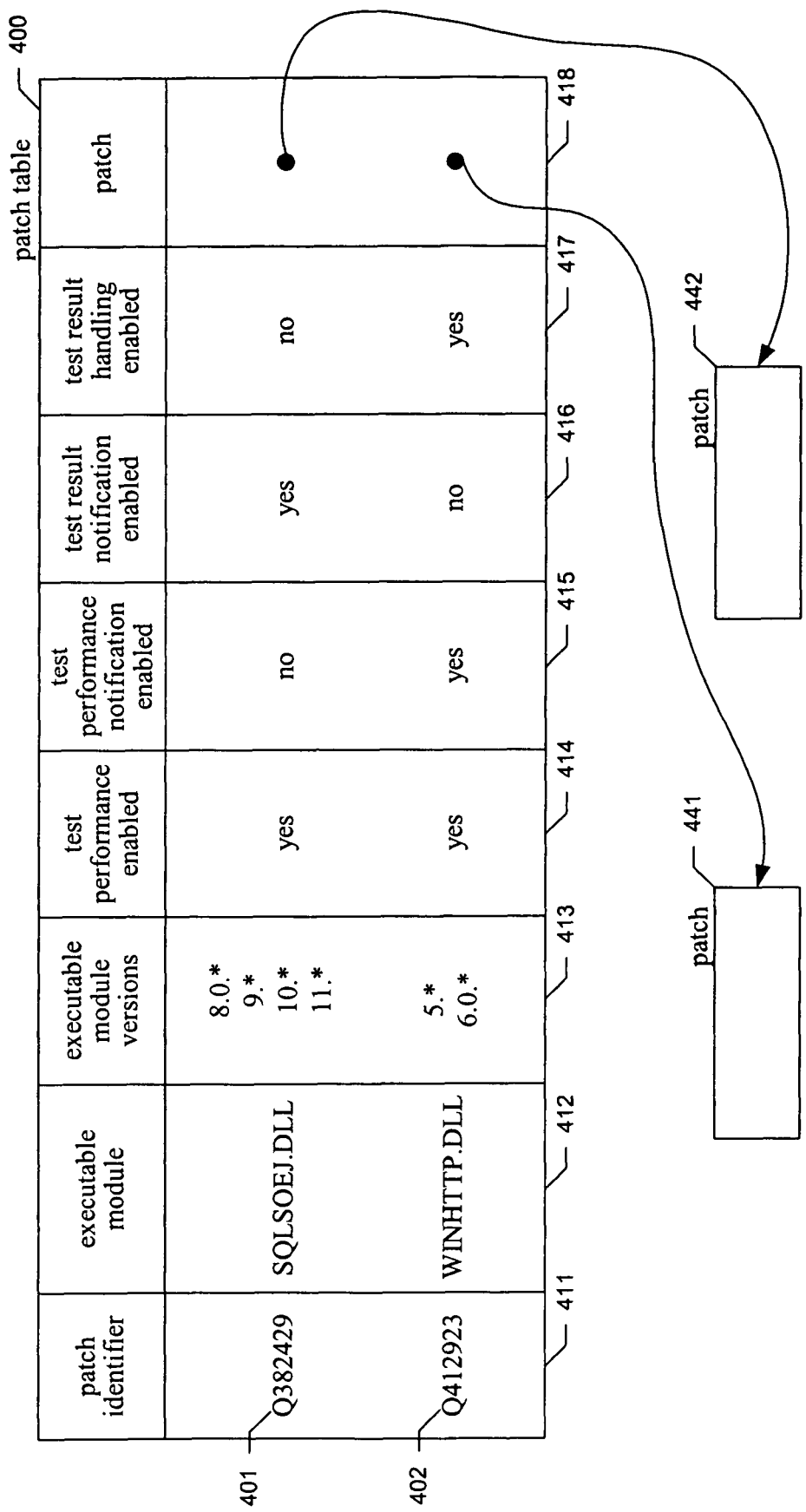
FIG. 4 is a data structure diagram showing a sample patch table typical of those used by the facility.

FIG. 4 is a data structure diagram showing a sample patch table typical of those used by the facility. The patch table 400 contains rows, such as rows 401 and 402, each divided into the following columns: a patch identifier column 411, containing the patch identifier extracted from the patch; an executable module column 412, containing information identifying the executable module to be patched, such as its name; an executable module versions column 413 identifying all of the versions of the executable module identified in column 412 to which the patch applies; a test performance enabled column 414, containing the current configuration value for whether the test specified by the patch should be performed each time the patched function is called; a test performance notification enabled column 415, containing the current configuration value for whether a notification should be generated each time the patch's test is performed; a test result notification enabled column 416, containing the current configuration value for whether a notification should be generated each time the patch's test succeeds; a test result handling enabled column 417, containing the current configuration value for whether the patch's result handling should be implemented when the patch's test fails; and a patch column 418 that contains a pointer to the patch itself, specifying a test and test result handling to be performed each time the test fails. In some embodiments, rather than containing a pointer to the patch as shown, the patch column 418 contains each patch directly. A particular patch table may contain or point to patches of various types, such as all code-driven patches, all data-driven patches, or a combination of code-driven and data-driven patches.

In step 305, once the facility has added the received patch to the patch table and initialized its configurations, the patch is available to be automatically applied by the facility to the executable module. In step 305, the facility may utilize a variety of approaches to applying the patch, including those described in the application incorporated by reference, as well as real-time function call interception, and/or code rewriting of (1) already-loaded executable modules, (2) one or more disk images of the executable module, or (3) instances of executable modules loaded by the operating system's loader. After step 305, the facility continues in step 301 to receive the next patch.

Figure 5:
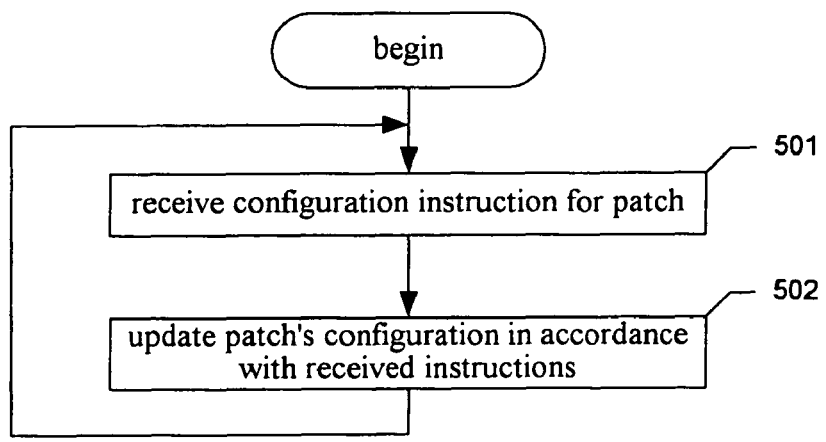
FIG. 5 is a flow diagram showing steps typically performed by the facility in order to update configuration instructions for a particular patch.

FIG. 5 is a flow diagram showing steps typically performed by the facility in order to update configuration instructions for a particular patch. In step 501, the facility receives configuration instructions for a particular patch, such as from an administrator. In some embodiments, such configuration instructions may be generated by administrators using group policies. In step 502, the facility updates the patch's configuration in the patch table in accordance with the received instructions. After step 502, the facility continues in step 501 to receive the next configuration instructions.

Figure 6:
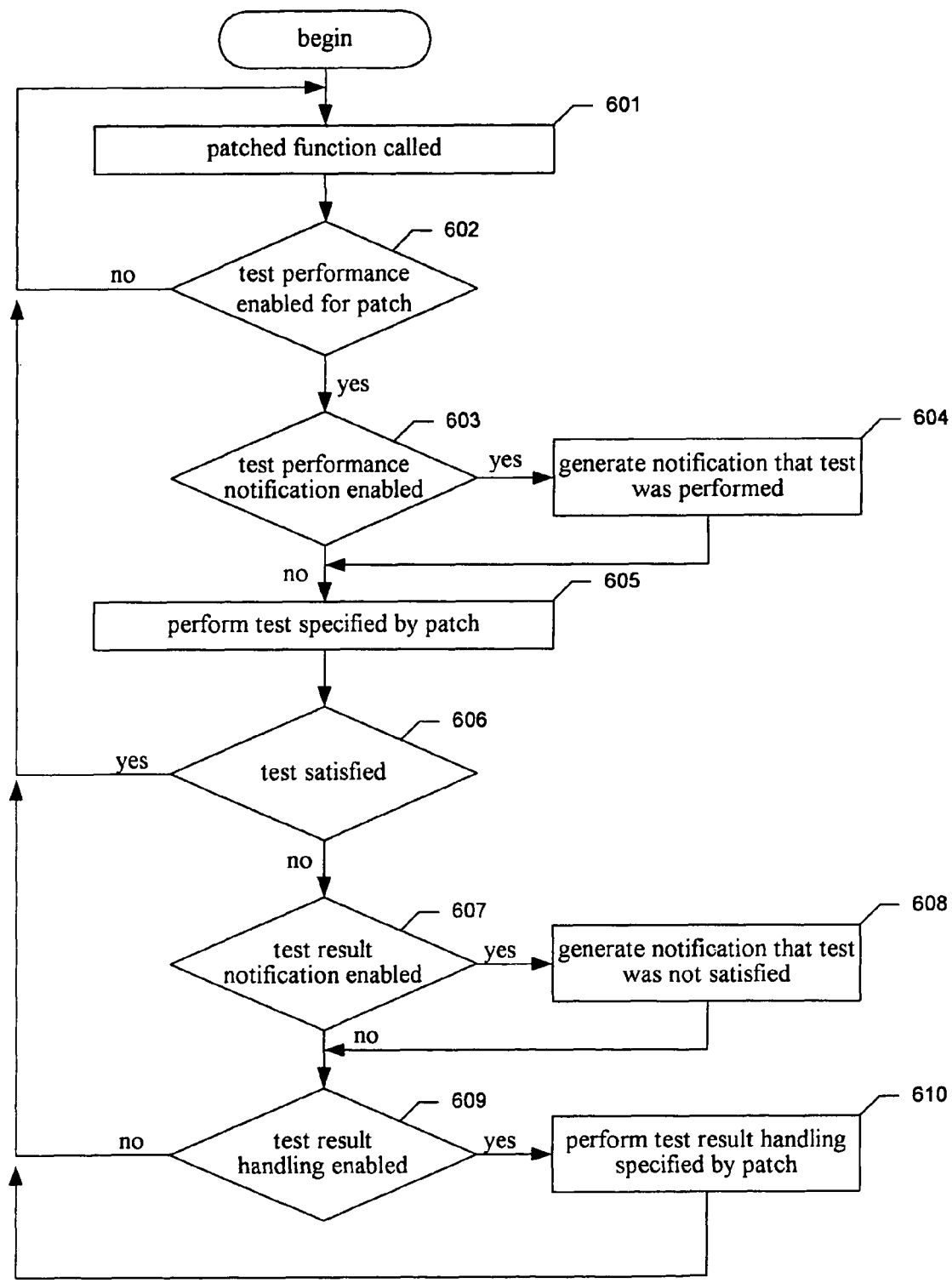
FIG. 6 is a flow diagram showing steps typically performed by the facility to perform the parameter validation specified by a patch.

FIG. 6 is a flow diagram showing steps typically performed by the facility to perform the parameter validation specified by a patch. In step 601, a patched function is called. In step 602, if testing is enabled for the patch that affects the called function, then the facility continues in step 603, else the facility continues in step 601 to process the next call to a patched function. In step 603, if test performance notification is enabled for the patch, then the facility continues in step 604, else the facility continues in step 605. In step 604, the facility generates a notification that the test was performed. Steps 604, 608, and 610 may involve displaying or storing an indication on the target computer system that the test was satisfied, and/or transmitting such an indication to a remote computer system for display or logging there.

In step 605, the facility performs the validation test specified by the patch. In some embodiments, step 605 involves calling one of a group of standard routines utilized by the facility for testing. In step 606, if the test performed in step 605 is satisfied, then the facility continues in step 601, else the facility continues in step 607. In step 607, if test result notification is enabled for the patch, then the facility continues in step 608, else the facility continues in step 609. In step 608, the facility generates a notification that the test was not satisfied. In step 609, if test result-handling is enabled for the patch, then the facility continues in step 610, else the facility continues in step 601. In step 610, the facility performs the test result handling specified by the patch. After step 610, the facility continues in step 601.

It will be appreciated by those skilled in the art that the above-described facility may be straightforwardly adapted or extended in various ways. For example, the facility may be used to apply a variety of different kinds of patches in a variety of ways at a variety of locations in executable modules of a variety of types for a variety of purposes. Also, while patches are described herein as containing value validation tests that indicate a problem when they fail, the facility may also be implemented using value invalidity tests that indicate a problem when they succeed. In some embodiments, each test is accompanied by an indication of whether its success or failure indicates a problem. While the foregoing description makes reference to preferred embodiments, the scope of the invention is defined solely by the claims that follow and the elements recited therein.

We claim:

1. A method in a computing system for augmenting software, comprising:
 receiving in a target computer system an augmentation specification specifying (a) a programmatic function to be augmented, the specified programmatic function being among software existing in the computing system, (b) an argument of the specified programmatic function, (c) a test to apply to the specified argument, and (d) a modification to perform to the behavior of the specified programmatic function if the specified test is not satisfied by the specified argument; and
 when the specified programmatic function is invoked on the target computer system, if the specified test is not satisfied by the specified argument, performing the specified modification to the behavior of the specified programmatic function.

2. The method of claim 1, wherein the modification specified by the augmentation specification is preventing the execution of the specified programmatic function.

3. The method of claim 1, wherein the modification specified by the augmentation specification is executing the specified programmatic function after alteration of the specified argument.

4. The method of claim 1, wherein a plurality of augmentation specifications are received in the target computer system.

5. The method of claim 4, further comprising maintaining all of the received augmentation specifications in a data structure.

6. The method of claim 1 wherein no user intervention is required subsequent to receiving the augmentation specification in order to perform the specified modification to the behavior of the specified programmatic function.

7. The method of claim 1 wherein the augmentation specification specifies a test to be applied to the specified argument by identifying an argument testing function to invoke whose code is not included in the augmentation specification.

8. The method of claim 1 wherein the augmentation specification specifies a test to be applied to the specified argument by identifying an argument testing function to invoke that was installed before the augmentation specification was received.

9. The method of claim 1 wherein the augmentation specification contains code.

10. The method of claim 9 wherein the code contained by the augmentation specification includes code invoking an argument testing function.

11. The method of claim 1 wherein the augmentation specification contains text identifying an argument testing function whose code is not included in the augmentation specification.

12. The method of claim 1 wherein the augmentation specification contains code for an argument testing function for performing the specified test.

13. The method of claim 11 wherein the code of the argument testing function identified by the text contained by the augmentation specification is not contained by the augmentation specification.

14. The method of claim 1 further comprising providing an interface for configuring a state for controlling the operation of the augmentation specification,
and wherein the specified modification to the behavior of the specified function is performed only when the state is an enabled state.

15. The method of claim 14 wherein the provided interface enables the operation of the augmentation specification to be configured locally.

16. The method of claim 14 wherein the provided interface enables the operation of the augmentation specification to be configured remotely.

17. The method of claim 14 wherein the provided interface enables the operation of the augmentation specification to be configured in accordance with a policy.

18. The method of claim 14 wherein the specified test is performed before any substantive code of the specified function is executed.

19. The method of claim 1 further comprising providing an interface for configuring warnings associated with the augmentation specification, and wherein, if the provided interface is used to enable warnings, generating a warning each time the test specified by the augmentation specification fails.

20. The method of claim 1, further comprising providing an interface for configuring notifications associated with the augmentation specification, and wherein, if the provided interface is used to enable notifications, generating a notification each time the test specified by the augmentation specification is performed.

21. The method of claim 20, further comprising consolidating the generated notifications into a single consolidated notification.

22. The method of claim 1 wherein the received augmentation specification is signed,
the method further comprising verifying the signature of the augmentation specification, and wherein the specified modification to the behavior of the specified programmatic function is performed only if verification of the signature of the augmentation specification was successful.

23. The method of claim 22 wherein the specified modification to the behavior of the specified programmatic function is performed only if the signer of the signature of the augmentation specification matches a signer of the software containing the specified programmatic function.

24. The method of claim 1, further comprising performing the specified test in response to detecting that the specified programmatic function has been invoked, without altering the code of the specified programmatic function.

25. The method of claim 1, further comprising altering the code of the specified programmatic function to perform the specified test when the specified programmatic function is invoked.

26. The method of claim 25 wherein the code of the specified programmatic function is altered by inserting into the code of the specified programmatic function a jump to a separate routine that performs the specified test.

27. The method of claim 1 wherein the specified programmatic function is provided in a distinguished executable module that is loadable using a loader, the method further comprising registering with the loader to have a routine that performs the specified test called before the specified programmatic function is executed in response to each invocation of the specified function.

28. A computing system that enables augmentation of software present in the computing system, comprising:
a storage device containing software;
a patch receiver that receives in the computing system a patch specifying (a) a point at which the software is to be augmented, (b) a value accessed by the software to be tested at the specified point, (c) a test to apply to the specified value, and (d) a modification to perform to the behavior of the software if the specified test is not satisfied by the specified value; and
a patching agent that injects code into the software at the specified point such that, when execution of the software reaches the specified point on the target computer system, if the specified test is not satisfied by the specified value, the specified modification to the behavior of the software is performed.

29. A computer-readable storage medium containing computer-executable instructions that cause a target computing system to perform a method for adding value validation to software available in the target computing system, comprising:
receiving in the computing system an augmentation specification specifying (a) a programmatic function to which value validation is to be added, the specified programmatic function being among software available in the computing system, (b) data to be tested that exists in the target computing system during execution of the specified programmatic function, (c) a test to apply to the specified data, and (d) a modification to perform to the behavior of the function if the specified test is not satisfied by the specified data; and when the specified programmatic function is invoked on the target computer system, if the specified test is not satisfied by the specified data, performing the specified modification to the behavior of the specified programmatic function.

30. The computer-readable storage medium of claim 29 wherein the specified test is a test that is always satisfied, irrespective of the value of the specified data.

31. A computer-readable storage medium encoding a patch data structure, comprising:

information identifying a programmatic function to which value validation is to be added;
information identifying data to be tested that exists in a target computer system during execution of the function;
information identifying a test to apply to the identified data; and
information identifying a modification to perform to the behavior of the identified programmatic function if the identified test is not satisfied by the identified data,
such that, if the patch data structure is received on a target computer system on which the identified programmatic function is executed, the contents of the patch data structure may be used to perform the identified modification to the behavior of the identified programmatic function if the identified test is not satisfied by the identified data when the identified programmatic function is invoked on the target computer system.

32. The computer-readable storage medium of claim 31 wherein the patch data structure is transmitted between computer systems.

33. The computer-readable storage medium of claim 31 wherein the patch data structure is transmitted within a computer system.

34. A method for adding value validation to software available in a target computing system, comprising:

receiving in the computing system an augmentation specification specifying (a) software to which value validation is to be added, (b) a point in the specified software at which value validation is to be added, (c) data to be tested that exists in the target computing system during execution of the specified software at the specified point, (d) a test to apply to the specified data, and (e) a modification to perform to the behavior of the software if the specified test is not satisfied by the specified data;
enabling a user to configure an operational mode for the received augmentation specification; and
when the specified software is executed at the specified point on the target computer system, applying the received augmentation specification in a manner consistent with the operational mode configured for the received augmentation specification.

35. The method of claim 34 wherein the user configures an active operational mode for the augmentation specification, and wherein applying the received augmentation specification in a manner consistent with the operational mode configured for the received augmentation specification comprises, if the specified test is not satisfied by the specified data, performing the specified modification to the behavior of the specified software.

36. The method of claim 34 wherein the user configures an active diagnostic operational mode for the augmentation specification, and wherein applying the received augmentation specification in a manner consistent with the operational mode configured for the received augmentation specification comprises, if the specified test is not satisfied by the specified data, both (1) performing the specified modification to the behavior of the specified software, and (2) generating a notification that the specified test is not satisfied by the specified data.

37. The method of claim 34 wherein the user configures a verbose active operational mode for the augmentation specification, and wherein applying the received augmentation specification in a manner consistent with the operational mode configured for the received augmentation specification comprises:

if the specified test is not satisfied by the specified data, performing the specified modification to the behavior of the specified software; and
generating a notification that the specified test was performed.

38. The method of claim 34 wherein the user configures an active verbose diagnostic operational mode for the augmentation specification, and wherein applying the received augmentation specification in a manner consistent with the operational mode configured for the received augmentation specification comprises:

if the specified test is not satisfied by the specified data, both (1) performing the specified modification to the behavior of the specified software, and (2) generating a notification that the specified test is not satisfied by the specified data; and
generating a notification that the specified test was performed.

39. The method of claim 34 wherein the user configures an inactive operational mode for the augmentation specification, and wherein applying the received augmentation specification in a manner consistent with the operational mode configured for the received augmentation specification comprises omitting to perform the specified modification to the behavior of the specified software, irrespective of whether the specified test is satisfied by the specified data.

40. The method of claim 34 wherein the user configures an inactive diagnostic operational mode for the augmentation specification, and wherein applying the received augmentation specification in a manner consistent with the operational mode configured for the received augmentation specification comprises:

omitting to perform the specified modification to the behavior of the specified software, irrespective of whether the specified test is satisfied by the specified data; and
if the specified test is not satisfied by the specified data, generating a notification that the specified test is not satisfied by the specified data.

41. The method of claim 34 wherein the user configures an inactive diagnostic operational mode for the augmentation specification, and wherein applying the received augmentation specification in a manner consistent with the operational mode configured for the received augmentation specification comprises:

omitting to perform the specified modification to the behavior of the specified software, irrespective of whether the specified test is satisfied by the specified data; and
generating a notification that the specified test was performed.

42. The method of claim 34 wherein the user configures an inactive diagnostic operational mode for the augmentation specification, and wherein applying the received augmentation specification in a manner consistent with the operational mode configured for the received augmentation specification comprises:

omitting to perform the specified modification to the behavior of the specified software, irrespective of whether the specified test is satisfied by the specified data;

generating a notification that the specified test was performed; and if the specified test is not satisfied by the specified data, generating a notification that the specified test is not satisfied by the specified data.

* * * * *